US012326253B1

(12) United States Patent
Brown et al.

(10) Patent No.: US 12,326,253 B1
(45) Date of Patent: Jun. 10, 2025

(54) TROPHY-SHAPED PICKLEBALL CANDLE HOLDER AND CANDLE

(71) Applicants: Stan Brown, Lakewood Ranch, FL (US); Ruth Brown, Lakewood Ranch, FL (US)

(72) Inventors: Stan Brown, Lakewood Ranch, FL (US); Ruth Brown, Lakewood Ranch, FL (US)

( * ) Notice: Subject to any disclaimer, the term of this patent is extended or adjusted under 35 U.S.C. 154(b) by 608 days.

(21) Appl. No.: 17/203,746

(22) Filed: Mar. 16, 2021

Related U.S. Application Data

(60) Provisional application No. 62/962,164, filed on Jan. 16, 2020.

(51) Int. Cl.
*F21V 35/00* (2006.01)
*A47G 19/30* (2006.01)
*G06F 3/16* (2006.01)

(52) U.S. Cl.
CPC .............. *F21V 35/00* (2013.01); *A47G 19/30* (2013.01); *G06F 3/165* (2013.01)

(58) Field of Classification Search
CPC .......... F21V 35/00; G06F 3/165; A47G 19/30
See application file for complete search history.

(56) References Cited

U.S. PATENT DOCUMENTS

| 6,371,632 | B1 * | 4/2002 | Lavy | F21V 17/007 |
| | | | | 362/406 |
| 6,688,759 | B1 * | 2/2004 | Hadjimichael | A01G 9/249 |
| | | | | 362/406 |
| D754,888 | S * | 4/2016 | Brown | D26/14 |
| D755,416 | S * | 5/2016 | Brown | D26/13 |
| 2005/0207155 | A1 * | 9/2005 | Jian | F21V 33/00 |
| | | | | 362/86 |

\* cited by examiner

*Primary Examiner* — Thomas M Sember
(74) *Attorney, Agent, or Firm* — Dorothy S. Morse

(57) ABSTRACT

The moving, candelabra-like, multi-arm lighted display is for enhanced viewer entertainment and excitement during festive/celebratory occasions, which first has the appearance of a trophy, but after a user lights a centrally-located candle wick, or other ignitable material accessed through the open top of the trophy, small candles hidden within the trophy with elongated wicks initially positioned in close association with the ignitable material then also become lit without further action on the part of the user. As the small/mini candles create heat, the trophy separates into downwardly rotating pieces that reveal a previously hidden centrally-located pickleball, the separated pieces of the trophy then providing a multi-arm array of lights around the pickleball. The display may optionally have a rotating or stationary pickleball, an audio component, LED lights, be disposable or reusable, and/or be used as a cake topping or table decoration.

10 Claims, 3 Drawing Sheets

TROPHY-SHAPED PICKLEBALL CANDLE HOLDER AND CANDLE

CROSS-REFERENCES TO RELATED APPLICATIONS

The applicants herein request domestic priority for the currently-filed U.S. utility patent application based upon U.S. provisional patent application 62/962,164, filed on Jan. 16, 2020 and also petition the U.S. Patent Office to restore benefit of U.S. provisional patent application 62/962,164. The inventors, invention title, and subject matter herein are the same as in U.S. provisional patent application 62/962, 164, which is also mentioned on their accompanying Application Data Sheet. Furthermore, the applicants request that this U.S. utility patent application herein be considered as timely filed, as it is being filed within two months of the 1-year term for U.S. provisional patent application 62/962, 164, their delay in filing this subsequent nonprovisional application was unintentional, and the Petition Fee under § 1.76 (b)(5) is also submitted.

BACKGROUND OF THE INVENTION—FIELD OF THE INVENTION

The invention herein relates to candles and candle holders that provide a moving, candelabra-like, multi-arm lighted display for enhanced viewer entertainment and excitement during festive/celebratory occasions. In the most preferred embodiment of the present invention, it first has the appearance of a trophy, and after a user lights the wick of its single, comparatively large, and centrally-located candle, other smaller (or mini) candles with the ends of their elongated wicks initially positioned in close association with the central candle's wick then also become lit without further action on the part of its user. As the small/mini candles become lit, the trophy shape opens to display a pickle ball supporting the large candle and the separated pieces of the trophy exterior creating a multi-arm array of candles around the pickle ball. Thus, the present invention has characteristics of both a candle that is singularly lit, and a candle holder supporting multiple smaller/mini candles in a decorative array that individually become lit as a direct result of the user's act of lighting the centrally-located candle.

To achieve its festive/celebratory occasion enhancement goal, the most preferred embodiment of the present invention herein incorporates component movement, an attractive decorative design in both its initial trophy-shaped ("closed") and final ("open") candelabra-like positions, and an element of surprise when originally hidden components (including a decorative centerpiece and individually lit mini candles) suddenly become visible to viewers as the trophy shape initially created by the movable candle holder members around the centerpiece rapidly changes into a candelabra-like display of glowing candles/lights. In all preferred embodiments of the present invention herein, the decorative centerpiece is sports-related and configured as a pickleball. The final presentation of a decorative array of substantially vertically-extending lights is displayed for viewers as the fully "open" position is reached, with the centerpiece optionally displaying rotational movement. In addition, an audio component can be included that provides a message or music when the candle holder members are in their trophy-shaped "closed" position, while the candle holder members move between their "closed" and "open" positions, when the candle holder members reach their "open" positions, or throughout the entire entertainment presentation. The audio component may also have a 'silent' mode at the option of its user, depending upon the occasion selected for its use. The small/mini candles are typically extinguished within a few minutes of being lit, and when the festive/celebratory occasion is concluded, the smaller/single-use preferred embodiments of the present invention that are made substantially from plastic material are typically discarded. As an alternative embodiment of the invention herein, candle-shaped lights (such as but not limited to multiple LED lights each having a candle-like shape or other configuration appropriate to the festive/celebratory occasion) may be mounted on the movable candle holder members in place of the lighted candles employed in the most preferred embodiment, making such alternative embodiments optionally reusable. The invention's size, the materials used for its construction, and the expense required for its construction are not considered as limiting or critical, and various non-patentably distinct embodiments of the present invention can vary widely in construction materials while at the same time still achieving the same entertainment enhancement, overall appearance and design, and visual presentation with exciting movement and surprise elements that please and thrill its viewers. On a smaller scale, the present invention may also be sized for use as a cake topping or table decoration.

Elongated, arm-like candle holder members in the present invention (preferably eight for cake topping and table decoration use) are each movably attached on their lower end to a candle holder member base, and also have at least one attached candle/light remotely positioned from the lower end that is initially hidden from viewers when the candle holder members collectively surround all of the candles (or lights) to form the starting trophy-shaped ("closed") position. As shown in the accompanying illustrations herein, the base may have a flat bottom surface, or a prong configuration with multiple legs. However, it is not contemplated for the present invention's base to be limited to the two configurations shown, as long as its base provides adequate support function for the candle holder members during their movement from "closed" to "open" positioning. The most preferred embodiment of the invention herein, while its candle holder members are in their "closed" positions, forms the trophy shape shown in the drawings accompanying this invention disclosure. However, it is also considered to be within the scope of the present invention for the candle holder members in their initial "closed" positions to collectively be used to form differing trophy shapes (fatter, shorter, taller, different handle shapes, and/or different surface decorations, patterns, or texture, and the like) as long as component movement similar to that achieved in the most preferred embodiment leads to the final "open" and candelabra-like position displaying an array of candles or lights, and in addition at least one element of surprise is also involved during the process of candle holder member movement between their initial "closed" trophy-shaped positions and their final "open" positioning. As an option, the trophy configuration may even comprise one or more "clear" spaces in one or more candle holder members through which viewers could have a brief preview of the starter wick causing the wicks of other smaller/mini candles to become ignited prior to the candle holder members' collective movement outwardly and downwardly away from one another and into their final "open" and candelabra-like positions.

For operation of the present invention, a user begins with the movable candle holder members (preferably eight of them when table-top or cake top use of the invention is contemplated), which are positioned adjacent to one another and form the trophy-shaped configuration initially observed by viewers. If the centerpiece of the present invention has a red dot centered on its top surface, the user may simply touch the hot/lit tip of a wooden, long-reach stick match to the red dot to activate the closely associated wicks of the smaller/mini candles fixed to all (or selected ones) of the individual candle holder members. If instead a starter wick is provided on the top surface of the present invention centerpiece, the user may light it with a kitchen match or household lighter. In the embodiments of the present invention having LED light substitution for candles, in place of a starter wick an activation switch or other device centered on top of the centerpiece could be present and activated using a starter wand or a user's hand. When candles are present, such as in the most preferred embodiment of the present invention, once a starter wick or the top of the centerpiece is lit, each small/mini candle has the distal end of its elongated wick in close proximity to the lit starter wick, lit red spot, or the lit wick of an adjacent small/mini candle, and all small/mini candle wicks become quickly ignited, during and after which the elongated candle holder members will each individually move from its initial vertically-extending position in an outwardly and downwardly direction away from the other candle holder members. Heated air around the lighted wicks is a factor in the candle holder member movement, as is gravity. In the most preferred embodiment of the present invention, the candle holder member movement from "closed" to "open" position occurs rapidly. When each candle holder member reaches its substantially horizontally-extending "open" position, the small/mini candle or candles secured to them assume substantially vertical positioning in an attractive/decorative candelabra-like display collectively around the centerpiece. When the candle holder members quickly move from their "closed" to "open" positions, the fast speed at which it occurs adds to the excitement shared by viewers. As the candle holder members collectively forming the initial trophy-shape collectively start to separate and begin their outward and downward rotation away from one another, the originally hidden centerpiece becomes progressively more visible, which in the instant patent application herein preferably includes the sport-themed shape of a pickleball. The exterior surface of the pickleball centerpiece may have no additional decoration, or instead may display a team name, team logo or design, or other decorative/informative/enlightening/explanatory marking or markings. Also as mentioned hereinabove, the centerpiece may also spin/rotate independently from the base supporting the candle holder members. In addition, the multiple lit candles which become progressively visible during the entertaining presentation, are substantially hidden from view at the outset when the candle holder members each have "closed" positioning. Also, while candle holder members forming the initial trophy shape of the present inventions are made from plastic material when sized for cake top or table-top decoration to make it inexpensive enough for disposal after festive/celebratory occasion use, other appropriate heat-resistant and fire-resistant materials may be substituted and are also considered to be within the scope of the present invention.

BACKGROUND OF THE INVENTION—DESCRIPTION OF THE RELATED ART

The inventors herein first created a football-shaped candle holder in 2013. It had eight separating candle holder members that in a "closed" position resembled a football and when in their "open" positions appeared as a candelabra-like arrangement of eight individual candle supports around a tapered centerpiece. They filed a U.S. design patent application on Jan. 20, 2014, and were granted U.S. design patent D734,513 on Jul. 14, 2015. Later, the inventors herein created a second candle holder that had a conical centerpiece also surrounded by eight candle holder members. However, in their "closed" positions the second candle holder members partially overlapped the next adjacent candle holder member similar to the manner in which the adjacent petals of an unopen flower can display an overlapped configuration. Once candles attached to the candle holder members in the inventor's second candle holder were lit, the eight candle holder members would start to move outward and downward toward their final "open" positions in a display resembling a candelabra-like arrangement. The inventors filed their second US design patent application on Oct. 2, 2014, and received their second U.S. design patent D754,888 on Apr. 26, 2016. The inventors herein then created another candle holder having its eight candle holder members collectively forming a trophy-shaped configuration in their initial "closed" positions. The centerpiece within the eight closed candle holder members had a spherical shape. The inventors herein filed a third U.S. design patent application for this trophy-shaped candle holder on Dec. 4, 2014, and received their third U.S. design patent grant D755,416 on May 3, 2016. Advantages of the present invention herein over the known prior art include its sports-minded tribute for those with an interest in pickleball, an increasingly popular paddleball sport that uses a net and has other similarities to the long enduring sports of tennis, badminton, and table tennis. All ages can play, it has simple rules and is easy to learn, and provides players with a good workout. There is no invention currently known with the same features and advantages as the present invention candle and candle holder disclosed herein, nor one that can promote and stimulate interest in the sport of pickleball in the same manner as the present invention with its enhanced viewer entertainment and excitement when used during festive/celebratory occasions.

SUMMARY OF THE INVENTION

The primary objective of this invention is to provide an entertaining candle and candle holder combination that is not simply a static/decorative device, but instead one that adds surprise and excitement to festive/celebratory occasions. A further object of this invention is to provide a candle and candle holder for single use, which is safe and easy to use, low manufacturing cost, and easily disposable after use. In addition, it is also an objective of this invention to provide a candle and candle holder with its individual candle holder members collectively forming an initial "closed" trophy shape that hides the candles prior to lighting. Additionally, it is an objective of this invention to provide a candle and candle holder with each candle holder member made from lightweight plastic material for rapid movement from "closed" to "open" positioning. It is also an objective of this invention to provide a candle and candle holder with an attractive decorative design in both its "open" and "closed" positions, component movement, an array of lights, the element of surprise when hidden components become visible to viewers, and may also include a centerpiece that moves/rotates independently from the base supporting the candle holder members, and/or an audio component. A further object of this invention is to provide a candle and candle holder with a centered starter wick that when lit starts the process of lighting the remaining candles as well as the outward and downward rotation of the individual candle holder members from their collective/initial, candle-hiding, "closed" trophy shape toward a substantially horizontally-extending "open" position where the candle (or candles/lights) secured to it assume a substantially vertical positioning in an attractive display around a centerpiece. In addition, it is an objective of this invention to provide an initially hidden pickleball centerpiece that becomes visible as the individual candle holder members move outwardly and downwardly away from one another to the "open" position. It is also an objective of this invention to provide a candle and candle holder combination that may be sized for use as a cake topping or table decoration.

This invention herein provides a collection of individual candle holder members that are independently movable from one another and collectively create an arrangement of candles into a single visual display for festive/celebratory occasion enhancement. The present invention has characteristics of both a candle that is singularly lit, and a candle holder supporting multiple smaller/mini candles in an expanded decorative array that individually become lit as a direct result of the user's act of lighting the centrally-located candle or wick associated with the top of the present invention centerpiece. This invention is also preferably intended for single use and disposal after that use, although when more expensive materials are used to construct the present invention it may be adapted for multiple-occasion use. The festive occasions for which the present invention can be used are wide ranging, such as but not limited to a birthday celebration for someone having an interest in pickleball, an important pickleball game victory, or an end of the season or end of a tournament celebration for participating pickleball players. The festive occasion enhancement provided by the present invention is multi-faceted, and includes an attractive decorative design in both "closed" and "open" positions, exciting component movement that maintains viewer interest, an array of lights that displays quick movement in outwardly and downwardly directions, the element of surprise when hidden components become visible as the candle holder members and lights fixed to them seek the "open" position, the optional addition of a spinning/rotating centerpiece, and an option for an audio component to provide sounds or music to add another element to the festive or commemorative experience. When candles are used, lighting them is easy, as it begins with the single lighting of a centered starter wick, after which the initial "closed" trophy shape formed by the candle holder members turns into a display of small/mini candles in an attractive array around a pickleball centerpiece. The structure and design of the present invention can be made appropriate in size for use as a cake topping or table-top decoration, or larger. The advantages and benefits provided by the present invention and disclosed herein are not currently known in the prior art.

DETAILED DESCRIPTION OF THE INVENTION

Figure 4:
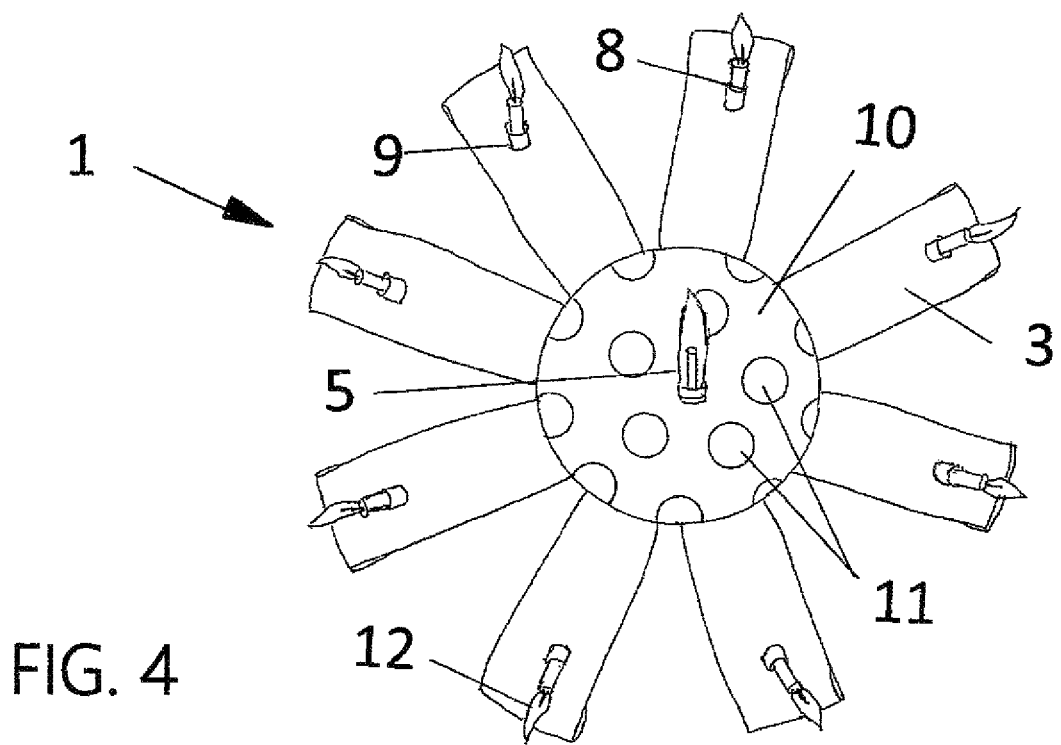
FIG. 4 is a top view of the invention in FIGS. 1-3, showing its candle holder members in their "open" positions and providing an array of candles around the pickleball centerpiece, the candles and top wick also lit as they would appear to a viewer when the candle holder members first reach their "open" positions.

The most preferred embodiment of this invention 1 provides a combination of eight individual candle holder members 3 that collectively create a candelabra-like arrangement of candles (or candle-shaped lights) 9 into a single decorative visual display that can be used to enhance festive/celebratory occasions. Invention 1 is also preferably intended for single use, and discard/disposal after that use. The occasions for which present invention 1 can be used are wide ranging, such as but not limited to a birthday celebration for someone having an interest in pickleball, a graduation, an important pickleball victory, or an end of the season or end of tournament celebration for pickleball players. The festive/celebratory occasion enhancement provided by invention 1 is multi-faceted, and includes an attractive decorative design both in the "closed" and "open" positions, component movement that maintains viewer interest, an array of candles/lights 9 that initially spread outwardly and downwardly away from one another, the element of surprise when hidden components become visible as the preferably eight candle holder members 3 preferably each supporting one candle/light 9 seek their "open" positions, the rapidness by which some of the movement occurs, the optional addition of a spinning/rotating centerpiece 10 (shown in FIGS. 2 and 4 as a pickleball with multiple holes 11, and when an audio component 7 is also present the sound or music further provided adds an additional element to the festive/celebratory entertainment experience. The lighting of candles 9 is easy, as it begins with the single lighting of centered starter wick 5 (or ignitable centered spot 5', see FIG. 6), after which the initial "closed" trophy shape turns into an attractive array of candles displayed around a pickleball-shaped centerpiece 10. Centerpiece 10 may spin/rotate, or not. The structure and design of the present invention 1 can be made appropriate in size for use as a cake topping or table decoration, or other sizes according to the intended use.

Figure 1:
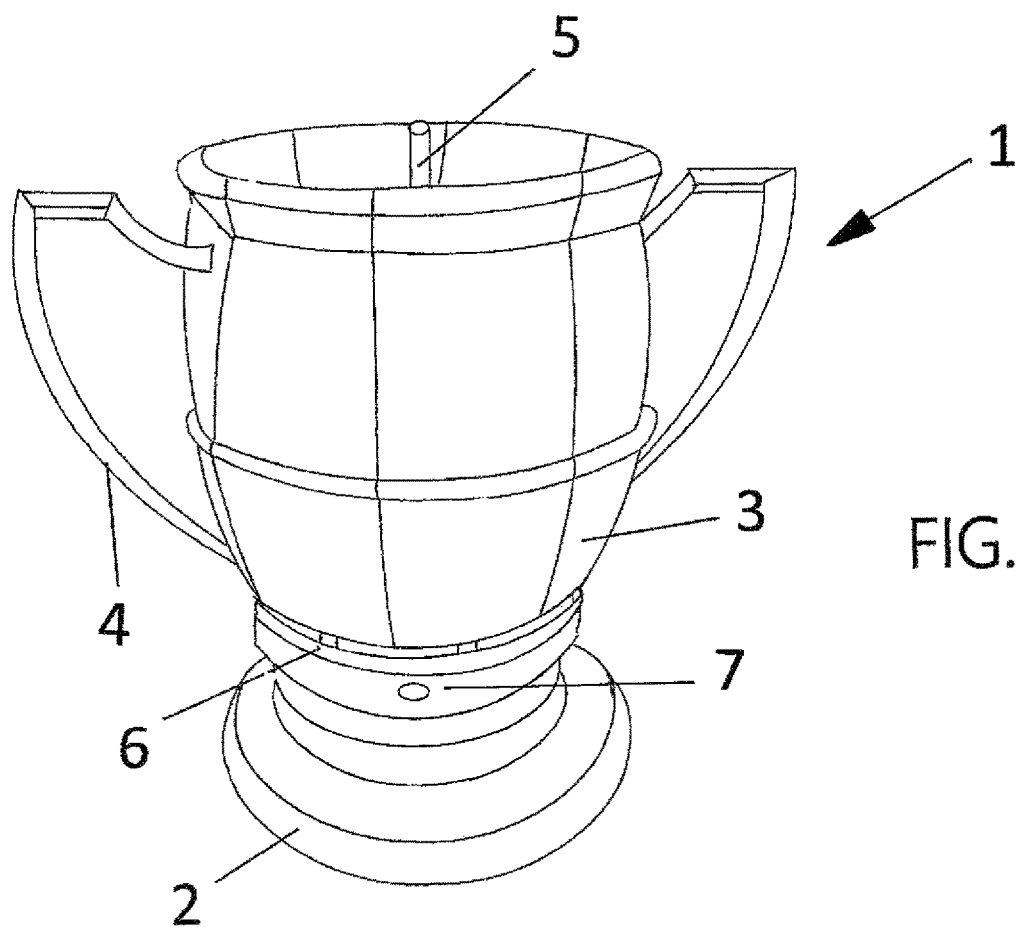
FIG. 1 is a perspective view from the front of a first preferred embodiment of the present invention with "closed" positioning that reveals the trophy-shaped form provided collectively by its outwardly and downwardly rotatable adjacent candle holder members when in their "closed" positions, its base having a flat bottom surface without legs or feet.
Figure 2:
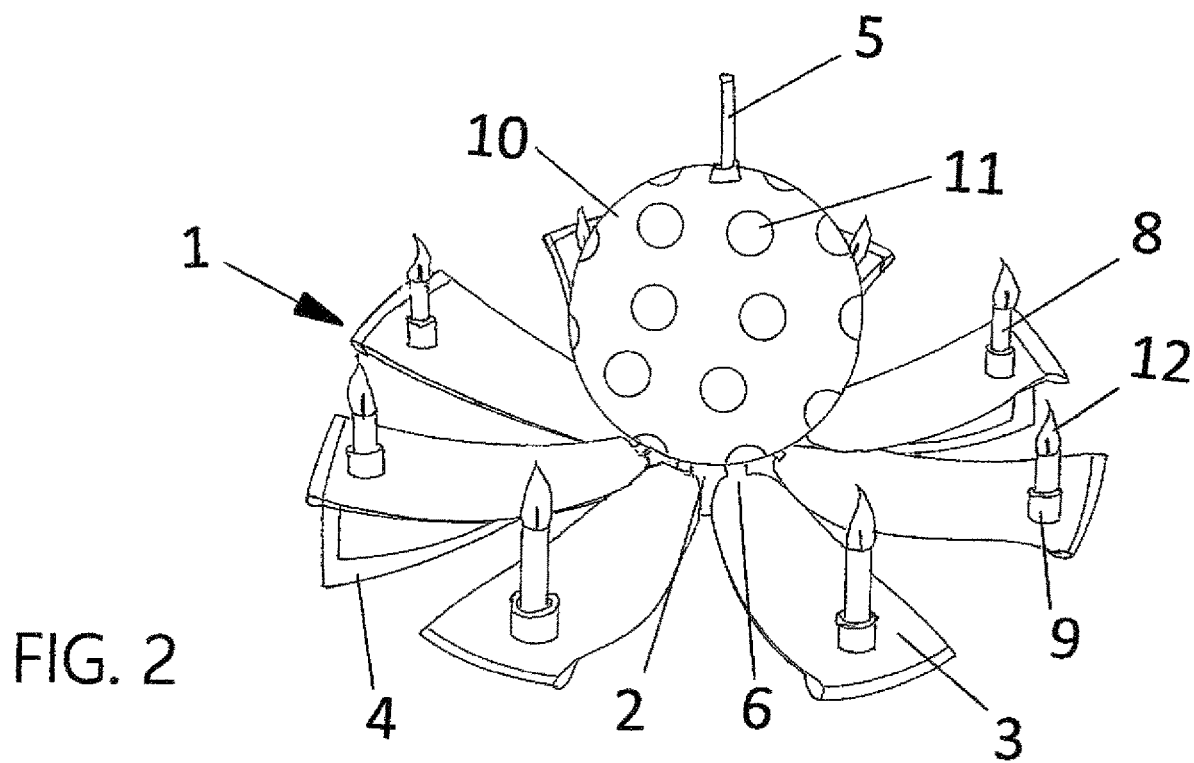
FIG. 2 is a front view of the invention shown in FIG. 1 with its candle holder members in their "open" positions that create an attractive candelabra-like display of candles around a pickleball centerpiece, each candle holder member having one substantially vertically-extending candle fixed to it, the pickleball centerpiece having multiple holes through its exterior surface and a large upwardly-extending top wick, and the candles and top wick lit as they would appear to a viewer when the candle holder members first reach their "open" positions.
Figure 3:
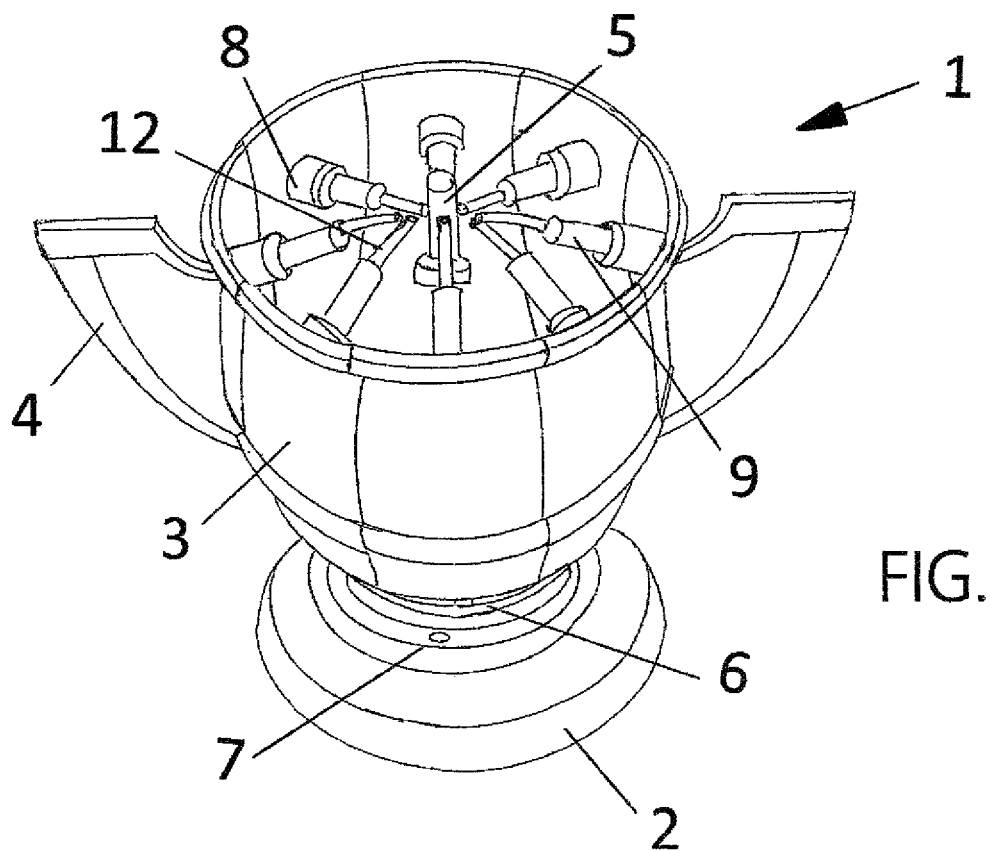
FIG. 3 is a perspective view from the top of the invention shown in FIGS. 1 and 2, which reveals the preferred positions of candle wicks in close association with one another when the candle holder members are in their "closed" positions to form a trophy-shaped configuration, the centerpiece being omitted from FIG. 3 for clarity of illustration so that the arrangement of candle wicks can be more easily determined by a viewer.

FIG. 1 is a perspective view from the front of a first preferred embodiment of the present invention 1 with "closed" positioning that reveals the trophy-shaped form provided collectively by its preferably eight outwardly and downwardly rotatable candle holder members 3. The number of candle holder members 3 can vary, but FIGS. 2 and 4 each show eight candle holder members 3. In the alternative, FIGS. 2 and 4 respectively show front and top views of the most preferred embodiment of the present invention 1 with "open" positioning that reveals the attractive display of candles (or candle-shaped lights) 9 around a pickleball centerpiece 10 that is provided collectively by its movable candle holder members 3 once the candles/light 9 are have become illuminated and arrive into their final and vertically-extending final "open" positions. In contrast, FIG. 3 is a perspective view from the top of present invention 1 showing its candle holder members 3 in their "closed" positions and multiple candle wicks 12 in close association with one another. The number of rotatable candle holder members 3 may vary from that shown in FIGS. 2 and 3, and their length, width, and thickness dimensions may also vary from that shown as long as the closed positioning retains the form of a trophy shape. In addition, surface decoration enhancement may be added to any part of the candle holder members 3 and still be considered as within the scope of the present invention. It is also not critical for the trophy handles 4 to have the exact same shape shown in FIGS. 1 and 2, as long as the configuration of trophy handles 4 contribute to the overall appearance of invention 1 having a "trophy" shape. More than one candle/light 9 may be supported by the interior surface of each rotatable candle holder member 3, and the means attaching each candle/light 9 to the interior surface of a candle holder member 3 may be different in configuration from the candle mount 8 shown in FIGS. 2 and 4. In addition, the number, size, and spacing of pickleball holes 11 in present invention 1 may be different from that shown in FIGS. 2 and 3, and still be considered to be within the scope and spirit of invention 1. The starter wick 5 may appear thicker and/or have a different length dimension than is shown in FIG. 2 and still considered to be within the scope of invention 1, and any audio component 7 can be located in a different position than is optionally shown in FIG. 1. One embodiment of hinge connection 6 for rotatable candle holder members 3 is also shown in FIG. 1 and appears at the lower end of the two closest candle holder members 3, positioned between the candle holder member 3 and trophy base 2, but its design and location should not be considered as a limiting feature of present invention 1. Also, while the exterior surface of pickleball centerpiece 10 is shown to have no additional decoration, in the alternative centerpiece 10 may display a team name, team logo or design, or other marking/markings, including but not limited to decorative, informative, enlightening, and/or explanatory markings.

Figure 5:
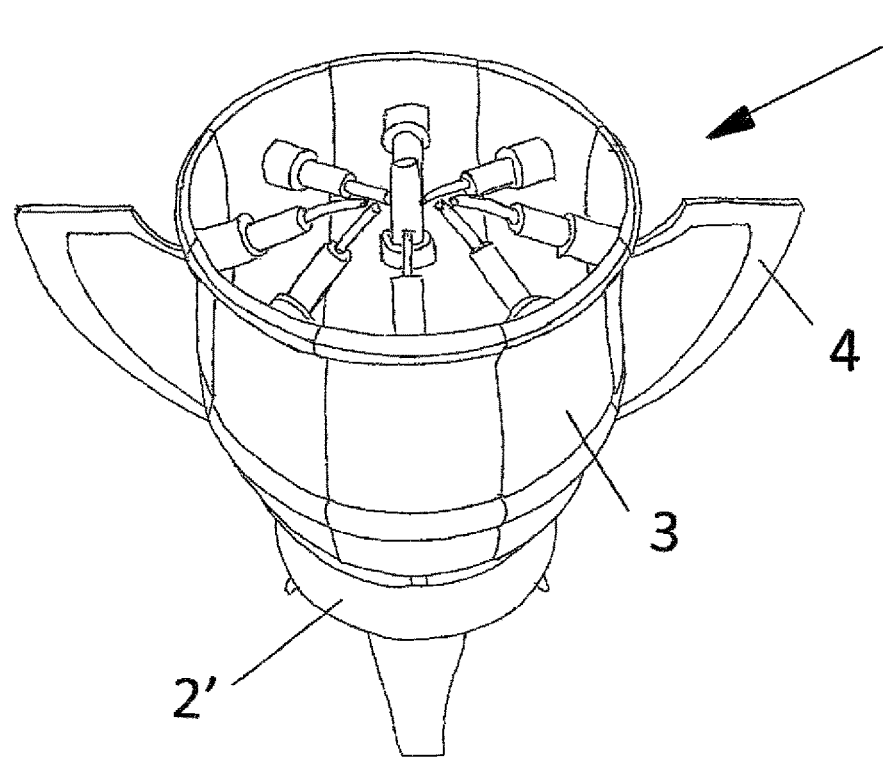
FIG. 5 is a perspective view from the top of a second preferred embodiment of the present invention, having a prong base instead of the flat bottom base shown in FIGS. 1-4, FIG. 5 also showing the candle holder members in their "closed" positions to form a trophy-shaped configuration, the prong base having three legs, positions of candle wicks in close association with one another, and the centerpiece omitted for clarity of illustration so that the arrangement of candle wicks can be more easily determined by a viewer.
Figure 6:
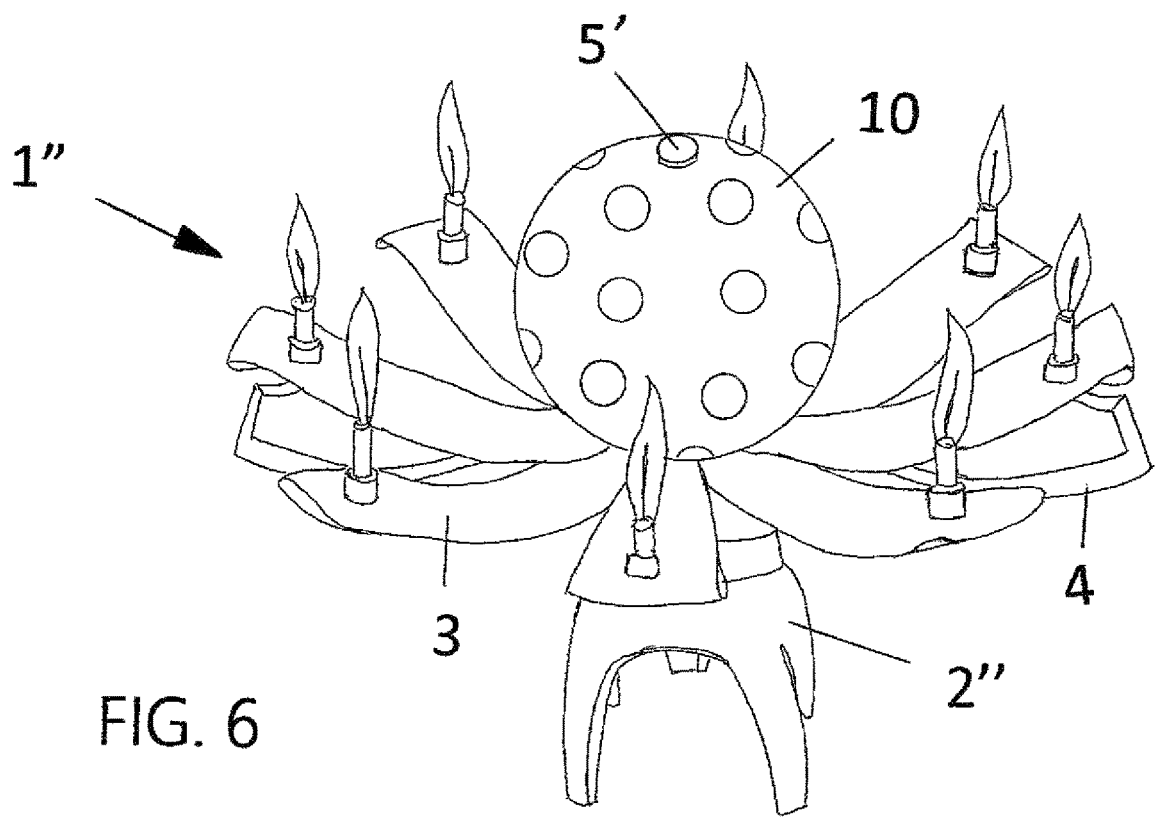
FIG. 6 is a perspective view from the front of a third preferred embodiment of the present invention having a prong base with five legs, FIG. 6 also showing the candle holder members in their "open" positions to form a candelabra-like display of candles around a pickleball centerpiece which has a spot of ignitable material centered on its top surface instead of a top wick that is used for lighting the small candles, and the candles are lit as they would appear to a viewer when the candle holder members are in their "open" positions, the ignitable spot on top of the centerpiece when touched with the hot/lit tip of a wooden, long-reach stick match quickly activates the closely associated wicks of the small candles.

FIGS. 5 and 6 each show a preferred embodiment of the present invention (respectively 1' and 1") with a different prong base (2' and 2"). FIG. 5 is a perspective view from the top of a second preferred embodiment of the present invention 1', having a prong base 2' instead of the flat bottom base 2 shown in FIGS. 1-4. FIG. 5 also shows candle holder members 3 in their "closed" positions to form a trophy-shaped configuration, prong base 2' having three legs, positions of candle wicks 5 and 12 in close association with one another, and the centerpiece 10 omitted for clarity of illustration so that the preferred arrangement of candle wicks (5 and 12) can be more easily determined by a viewer. FIG. 6 is a perspective view from the front of a third preferred embodiment 1" of the present invention having a prong base 2" with five legs. FIG. 6 also showing the candle holder members 3 in their "open" positions to form a candelabra-like display of candles 9 around a pickleball centerpiece 10. The configuration of the base (2, 2', 2", or other) in the present invention is not critical, as long as it provides stable support of candle holder members 3 during their movement from "closed" to "open" positioning. FIG. 6 shows an additional difference from FIGS. 1-5, in that in place of a candle wick 5 on top of the pickleball centerpiece 10, it has ignitable centered spot 5' which when touched with the hot/lit tip of a wooden, long-reach stic match quickly activates the closely associated wicks of the small candles while in positions identical to (or approximating) that shown in FIG. 5.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

We claim:

1. A display for use during festive and celebratory occasions, said display comprising:
    a hollow and open-topped trophy-shaped housing supported on a base and having at least one handle, said housing separable into a plurality of sections movable with respect to said base from a closed position depicting the shape of a trophy to an open position where said sections are separated from one another creating a candelabra-like combination candle and candleholder appearance;
    said sections each further characterized by an upwardly-directed surface in said open position and at least one light-creating object associated with each said upwardly-directed surface;
    a pickleball centerpiece positioned above said base and hidden when said housing sections are in said closed position, said pickleball having a top portion configured for activating light emission from said light creating objects during their movement with said associated trophy sections from said closed position to said open position;
    wherein when a user engages said activating top portion of said pickleball centerpiece, said activating top portion causes said light creating objects to become lit, and without further action from the user the trophy sections move rapidly from said closed position to said open position, revealing said previously hidden and centrally-located pickleball centerpiece and causing viewer excitement and entertainment.

2. The display of claim 1 wherein said light creating objects are selected from a group consisting of candles and light emitting diodes.

3. The display of claim 2 wherein said light creating objects are candles with elongated wicks in close association with one another in said closed position.

4. The display of claim 1 wherein said activating top portion of said pickleball centerpiece is selected from a group consisting of a candle wick, a quantity material that when ignited causes a flame, a quantity of material that when ignited causes sparks, and an activation switch.

5. The display of claim 1 wherein said pickleball centerpiece is selected from a group consisting of a stationary pickleball, a rotating pickleball, a pickleball rotating during movement of said trophy sections from said closed position to said open position, and a pickleball rotating during movement of said trophy sections from said closed position to said open position and further rotating after said trophy sections reach said open position.

6. The display of claim 1 further comprising an audio component.

7. The display of claim 6 wherein said audio component selected from a group consisting of music, spoken words, a combination of spoken words and music, an audio component with a shut-off option.

8. The display of claim 1 further comprising materials configured for disposable use.

9. The display of claim 1 further comprising materials configured for reuse.

10. The display of claim 1 configured from non-toxic materials appropriate for food use, allowing use of said display as a cake topping.

* * * * *